US012138941B2

(12) United States Patent
Franco Morera et al.

(10) Patent No.: US 12,138,941 B2
(45) Date of Patent: Nov. 12, 2024

(54) DETERMINING PARTICLE CONCENTRATION

(71) Applicant: Hewlett-Packard Development Company, L.P., Spring, TX (US)

(72) Inventors: Albert Franco Morera, Sant Cugat del Valles (ES); Andreu Cortes, Sant Cugat del Valles (ES); Aleix Fort Filgueira, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 142 days.

(21) Appl. No.: 18/006,242

(22) PCT Filed: Jul. 23, 2020

(86) PCT No.: PCT/US2020/043256
§ 371 (c)(1),
(2) Date: Jan. 20, 2023

(87) PCT Pub. No.: WO2022/019911
PCT Pub. Date: Jan. 27, 2022

(65) Prior Publication Data
US 2023/0286306 A1 Sep. 14, 2023

(51) Int. Cl.
*B41J 29/377* (2006.01)

(52) U.S. Cl.
CPC .................................. *B41J 29/377* (2013.01)

(58) Field of Classification Search
CPC ........... B41J 29/377; B41J 2/195; B41J 2/175
See application file for complete search history.

(56) References Cited

U.S. PATENT DOCUMENTS 7,758,176 B2 7/2010 Kojima
2004/0047646 A1 3/2004 Yon et al.
2005/0286927 A1* 12/2005 Brenner ............... G03G 15/107 399/91
2009/0040249 A1 2/2009 Wouters et al.
2016/0246202 A1 8/2016 Ota et al.

FOREIGN PATENT DOCUMENTS

DE 102014107202 A1 11/2015
EP 0790893 A1 8/1997
JP 4871706 B2 2/2012
JP 2016-139032 A 8/2016
WO 96/14211 A1 5/1996

* cited by examiner

*Primary Examiner* — Bradley W Thies
(74) *Attorney, Agent, or Firm* — Jordan IP Law, LLC

(57) ABSTRACT

According to an example, a method for a printing system comprises reading configuration data of a printing environment for the printing system, determining based on the configuration data if a concentration of particles emitted during a printing operation of the printing system will exceed a threshold over a time period, and executing at least one remedial action on the printing operation if the concentration of particles will exceed the threshold.

15 Claims, 5 Drawing Sheets

300

400

DETERMINING PARTICLE CONCENTRATION

BACKGROUND

Printing systems perform printing operations within a wide variety of different printing environments. However, depending on the content being printed and the printing technology used by the printing system, undesired particles may be released to the environment. Amongst others, impacts derived from these undesired particles are a lower efficiency of the printing system, a damage over the own system and system(s) close by, and depending on the nature of the particles, they may eventually imply a hazard for operators within the printing environment when being breathed in.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
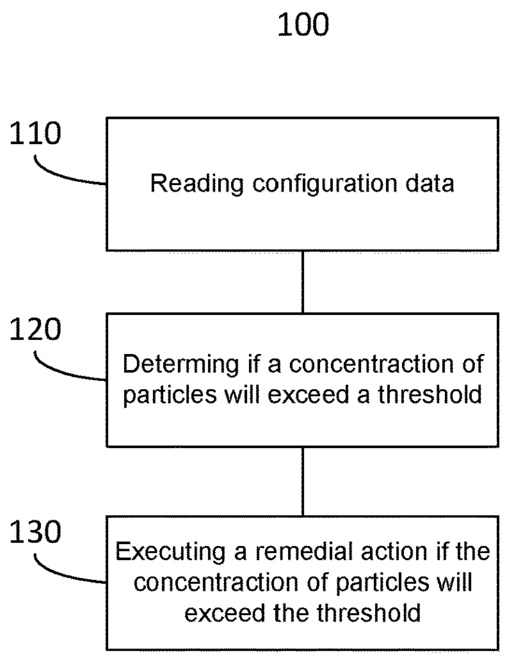
FIG. 1 shows a method for a printing system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Printing devices and systems are to perform printing operations within printing environment(s). During the performance of printing operations, particles may be released into the printing environment as a result of a step of a printing operation, for instance, an application of printing fluid or an evaporation of printing fluid. Some printing devices and systems comprise applying a pre-treatment upfront ejecting fluid on the media and applying a post-treatment upon the fluid has been disposed on the media. Additionally, during the ejection of the fluid on the media the print zone may be within a range of conditions so as to assure a standard of quality. Depending on the technology being used to perform the printing operation, the steps and the conditions may differ, e.g., absence of pre-treatment stage, different special conditions for the ejection, application of a coating to increase properties, amongst others.

As used herein, "printing fluid" refers generally to any substance that can be applied upon a substrate by a printer during a printing operation, including but not limited to inks, primers, and overcoat materials (such as a varnish), water, and solvents other than water.

Some printing technologies use a printing fluid comprising a series of solvent components to provide the color load or fluid properties. During a printing operation, part of the solvents may be evaporated as a step of the printing process, and the rest may evaporate either in natural conditions or being forced by other means, for instance, by using lamps and dryers. As evaporation occurs, particles may accumulate in the room in which the printing device is located, i.e. the printing environment. However, the concentration of particles within the printing environment may have an impact on the performance of the printing device itself and the other devices sharing the printing environment. In an example, the concentration of particles may decrease the accuracy of optical sensors used by the printing system, such as encoders or line sensors. In other examples, an accumulation of particles around a specific volume within the printing environment can impact on the performance of the printing device. Furthermore, some of these particles released to the printing environment may be limited by the environmental and workplace regulations, since in case of being inhaled in by people within the room, they may imply risks for their health.

The importance of monitoring the particles released by a printing device or system arises when the printer is associated to industrial environments in which printing devices and systems are used to perform printing operations over large periods of time. Nonetheless, non-industrial facilities with lower volumes may also be impacted by the particles generated during printing operations. In order to comply with the regulations concerning specific types of particles, printing operations should be tracked while being performed.

Disclosed herein are examples of methods, printing systems, and printing devices that may be used to track and manage the particles emitted during printing operations. Hence, different examples of devices, methods, and systems will be described.

According to some examples, a concentration of particles within a printing environment may be determined based on a printing operation to be performed by using a printing device. The printing environment may be associated with configuration data, wherein the configuration data defines several features for the printing environment, for instance the dimensions, the location of the printing device within the printing environment, and the extraction mechanism(s) being used in the printing environment and its extraction capabilities.

When referring to tracking a concentration of particles, different concentrations of particles may be determined. On the one hand, dust levels emitted to the environment as a result of the usage of powder-based printing technologies, such as toners, may be determined upfront and during the printing operation from the data associated to the printing operation such as an amount of fluid applied, a printing speed, an amount of pre-processing/post-processing fluid, and configuration data for the printing environment. By tracking the concentration within the environment, the concentrations of dust particles outside safe levels, for instance above 9 μg/m3, may be prevented.

On the other hand, volatile organic compounds (VOCs) to be released to the printing environment may be determined upfront and during the printing operation. Volatile organic compounds may result from the usage of, for instance, thermal inkjet technologies or piezoelectric technologies. Some printing technologies comprise the evaporation of fluids during their printing operations, and therefore, some particles may be accumulated in the room resulting from evaporation of a printing fluid, such as solvents. These particles may create discomfort within the printing environment and they may even imply a risk to the individuals who may breathe them in. As previously described in reference to dust levels, the concentration of particles for volatile organic compounds may be determined from the printing operation, taking into account printing operation characteristics such as an amount of fluid applied, a printing speed, an amount of pre-processing/post-processing fluid, and configuration data for the printing environment. By determining a concentration of particles for the printing operation, the concentrations of volatile organic compounds outside safe levels, for instance above 85 mg/m3, may be prevented. Depending on the regulations, such as workplace regulations or environmental regulations, other safe levels may be set, for instance 120 mg/m3.

Referring now to FIG. 1, a method 100 for a printing system is shown. The method 100 comprises reading configuration data 110, determining if a concentration of particles will exceed a threshold 120 and executing a remedial action if the concentration of particles will exceed the threshold 130. Reading configuration data 110 comprises reading configuration data of a printing environment for the printing system, wherein the configuration data may comprise characteristics from the printing environment, for instance at least one of the dimensions of a volume in which the printing system is to be located, an air change rate for the volume, and the relative position of the printing system within the volume. Determining if a concentration of particles will exceed a threshold 120 comprises determining, based on the configuration data, if a concentration of particles emitted during a printing operation of the printing system will exceed a threshold over a time period. The configuration data may be used to determine the concentration to be emitted when executing the printing operation. The threshold may be a maximum concentration permitted within the printing environment, i.e., a maximum concentration within the printing environment. Executing a remedial action if the concentration of particles will exceed the threshold 130 comprises executing a remedial action on the printing operation if the concentration of particles will exceed the threshold over the time period.

In an example, a remedial action comprises at least one action selected from modifying a printing speed of a dispenser of the printing system and modifying an amount of fluid ejected by the dispenser of the printing system. Due to the fact that some particles are more likely to be emitted to the printing environment at specific conditions of the printing system, i.e. high speeds of the dispenser or high density plots, printing operations may be modified so as to keep the concentration of particles below the threshold value. However, other different remedial actions may be performed, such as temporarily halting the printing operation or modifying the amount of fluid to be printed and/or the number of swaths along a scan axis of the printing system.

In other examples, remedial actions are selected based on a set of characteristics of the printing operation. The set of characteristics may comprise a type of printing operation, a specific range of colors/quality, a number of copies, a printing time for the printing operation, amongst others.

Figure 2:
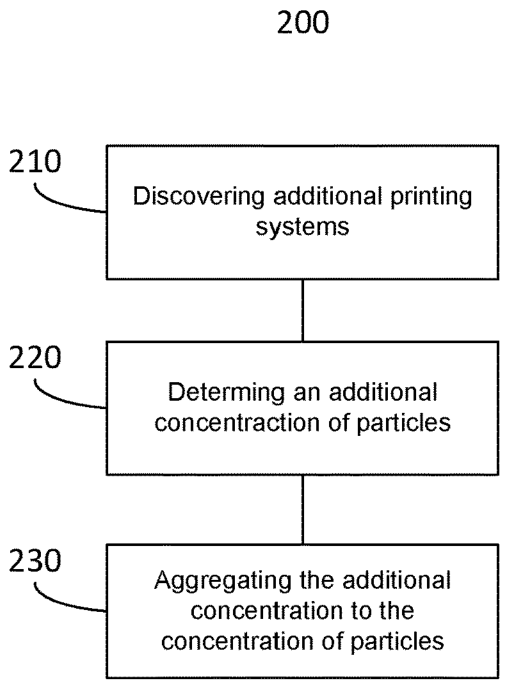
FIG. 2 shows an additional method for a printing system, according to an example of the present disclosure.

Referring now to FIG. 2, an additional method 200 for a printing system is shown. In an example, the method 100 further comprises the method 200. The method 200 comprises: discovering additional printing systems 210 in the printing environment, determining an additional concentration of particles 220 emitted during additional printing operations of the additional printing systems based on the configuration data, and aggregating the additional concentration to the concentration of particles 230. Since the additional printing systems are within the same printing environment as the main printing system, the configuration data provided for the main printing system may be used for the additional printing systems. In case the configuration data of the main printing system comprises a relative location within a volume, the additional printing systems may be added to the configuration data of the printing environment based on a connection between devices.

In an example, the additional printing systems are discovered using a wired connection such as a local network or a wireless connection such as Wi-Fi or Bluetooth. In other examples, other discovery protocols may be used, such as neighbor discovery protocols (NDPs), Link Layer Discovery Protocols (LLDPs), or local networks using multicast Domain Name System (mDNS) service records.

In some examples, the configuration data may be defined during the installation of the printing system in a facility. As described above, the configuration data may comprise a volume in which the printing system is to be located and the air change rate for the volume. As a part of the installation, the printing system may comprise a stage in which the printing environment is defined, i.e. the layout of the facility and the available equipment for air exchange. In other examples, when using the printing system in a more dynamic layout, a user may store configuration data into a readable medium so as to introduce/update the data referring to the printing environment. In some examples, the readable medium is a memory comprised in the printing device itself. In other examples, the configuration data may be stored remotely, i.e. a server, a computer having connectivity with the printing system, or an external device connectable to the printing system.

According to an example, a concentration of particles may be determined within a volume of air. In case a concentration of particles is to exceed a threshold over a time period in which the printing operation is to be performed, a remedial action may be scheduled to be executed at some point within the time period. Determining a concentration of particles of a printing operation comprises computing the printing operation so as to calculate concentration released, i.e. emitted, to the environment.

According to some examples, the determination of the concentrations may be performed before the printing operation, and hence, the remedial actions may be scheduled to be executed based on the user's criteria and job priority or priorities. In an example, the user may prefer to maintain the printing time while decreasing the density of the plot. In other examples, the user may desire to increase the printing time while having a higher standard of quality. In some other examples, a printing operation may be temporarily stopped to prevent a concentration of particles over the threshold concentration.

Figure 3:
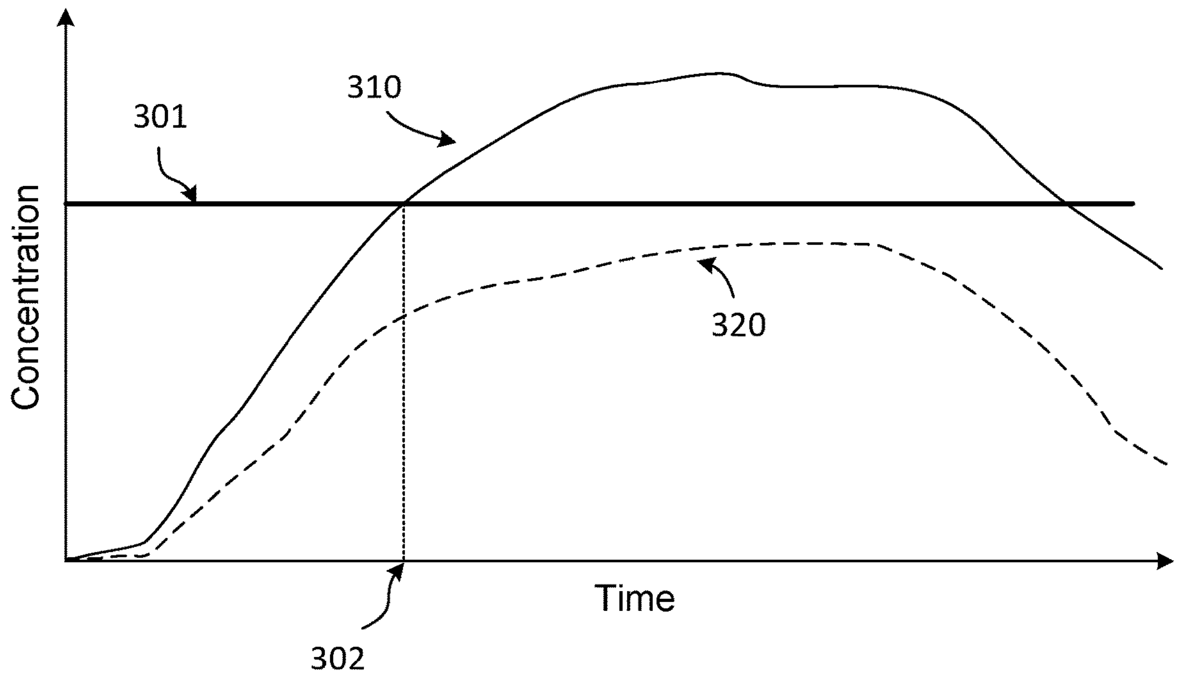
FIG. 3 shows a line chart representing concentrations of a first printing operation and a printing operation over a time period, according to an example of the present disclosure.

Referring now to FIG. 3, a line chart 300 representing a determination of concentration of particles for a first printing operation 310 and a second printing operation 320 over a time period is shown. The Y-axis represents a concentration of particles and the X-axis represents a timeline of a time period. As previously explained in the description, the concentrations of particles may be determined for the printing operations based on configuration data of the printing environments. In an example, the configuration data of the printing environment comprises dimensions of a volume in which the printing system is to be located and an air change rate for the volume. A threshold 301 is represented as a horizontal bold line in the line chart 300, wherein the threshold 301 represents a maximum concentration of particles allowed for the printing environment. As shown in the line chart 300, the concentration of the first printing operation 310 is to intersect the threshold 301 at a time 302. At a later stage, the concentration is to decrease to allowable levels.

In the example of FIG. 3, the first printing operation 310 represents the concentration to be released to the printing environment while printing a plot and the second printing operation 320 represents the concentration to be released to the printing environment while printing the plot of the first printing operation with a lower density. The different densities for a plot may be obtained by different methods, for instance, by applying less printing fluid to an area of a print media or by using a different fluid with different properties for the printing operation.

In some examples, a remedial action is executed on a printing operation if a concentration of particles is to exceed a threshold concentration. For instance, referring back to FIG. 3, a remedial action may be executed in the first printing operation 310 so as to reduce the concentration of particles, thereby preventing an excess of the concentration of particles with respect to the threshold 301.

Figure 4:
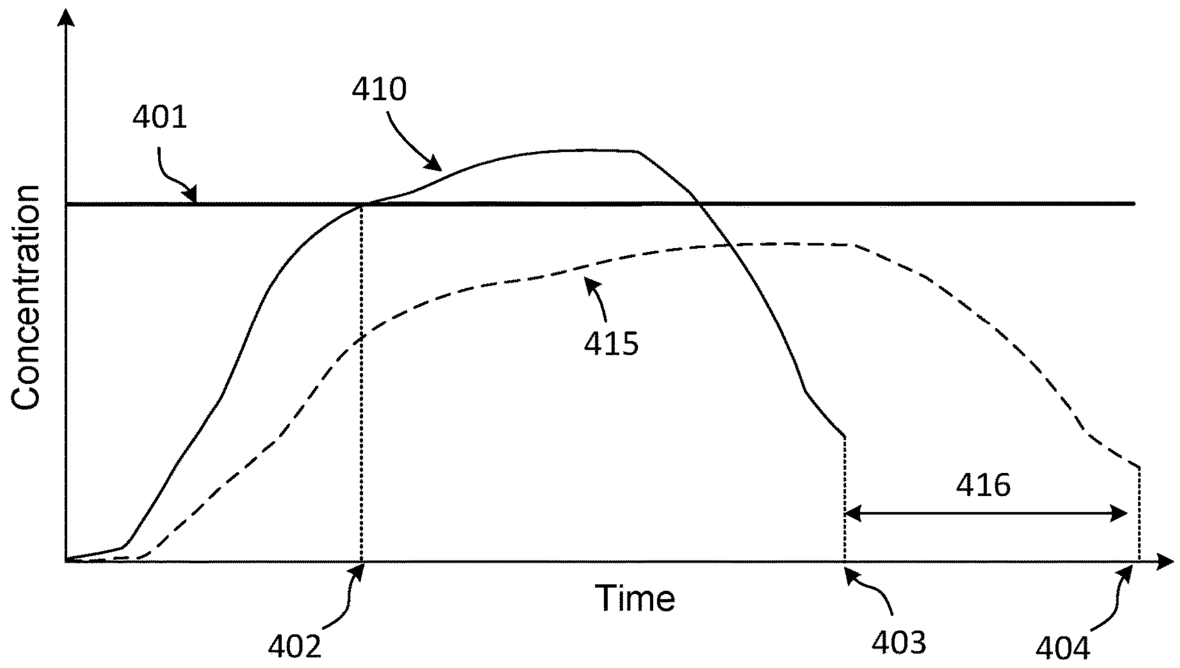
FIG. 4 shows a line chart representing concentrations of a printing operation and an adjusted printing operation over a time period, according to an example of the present disclosure.

Referring now to FIG. 4, a line chart 400 representing a determination of a concentration of particles for a printing operation 410 and an adjusted printing operation 415 over a time period is shown. A threshold concentration 401 is represented as a horizontal line and the concentration of particles of the printing operation 410 is to exceed the threshold 401 at a time 402. The printing operation 410 is determined to be finished at a finish time 403. In order to prevent the concentration exceeding the threshold 401, a remedial action may be executed on the printing operation 410.

In the example of FIG. 4, the remedial action comprises modifying a printing speed of a dispenser of the printing system, and thereby, the finish time 403, in which the printing operation 410 was determined to finish, is modified. As a result of the remedial action, the adjusted printing operation 415 is obtained. The adjusted printing operation 415 is determined to be finished at an adjusted finish time 404, thereby having an additional time 416 with respect to the finish time 403 of the printing operation 410.

As shown in FIG. 4, the adjusted printing operation 415 will not exceed the threshold 401 during the printing operation. In other examples, the remedial action may further comprise modifying the density of the plot so as to reduce an increase of the concentration within the printing environment, as previously explained in reference to FIG. 3.

According to some examples, further printing systems may be discovered within a printing environment, as explained in the method of FIG. 2. These further printing systems may have associated an additional concentration, wherein the additional concentration comprises the concentrations to be released to the printing environment during additional printing operations to be performed by the additional printing systems.

Figure 5A:
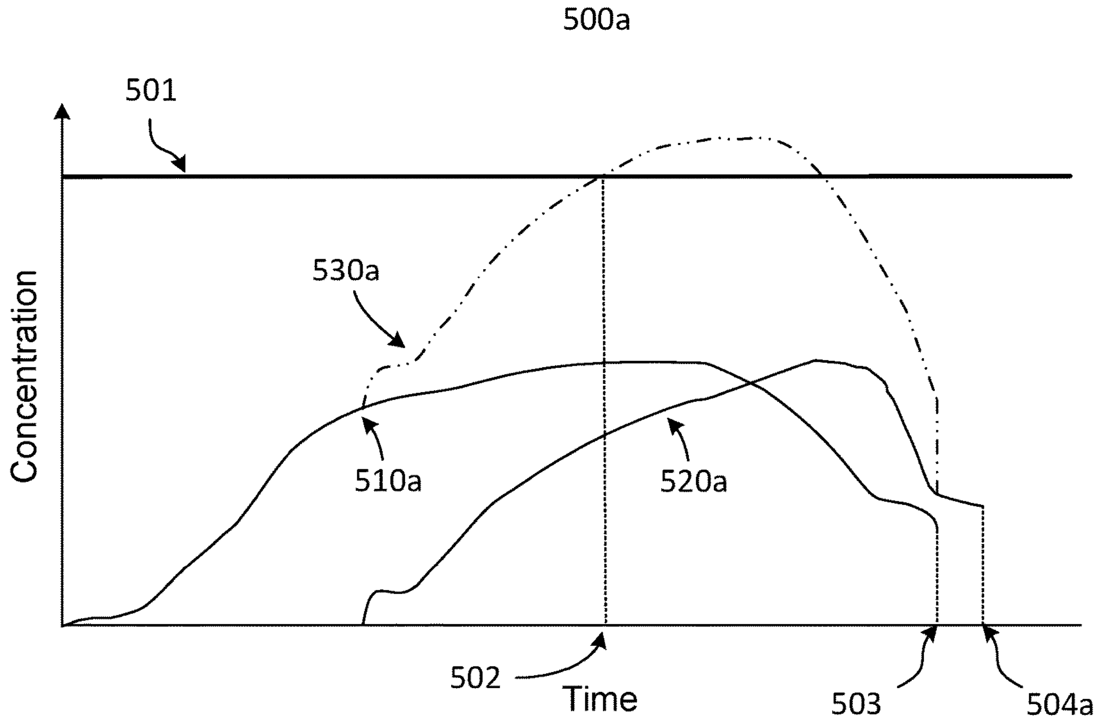
FIG. 5A shows a line chart representing concentrations over a time period of a first printing device and a second printing device within a printing environment, according to an example of the present disclosure.

Referring now to FIG. 5A, a line chart 500*a* representing concentrations generated by a first printing system and a second printing system is shown. Both systems are comprised within a printing environment and a threshold concentration 501 indicates a maximum value of a concentration of particles within the environment. The first printing system is to perform a first printing operation 510*a* and the second printing system is to perform a second printing operation 520*a*, wherein the first printing operation 510*a* is to finish at a first finish time 503 and the second printing operation is to finish at a second finish time 504*a*. A concentration of particles 530*a* results from the aggregation of the concentration of the second printing operation 520*a* and the concentration of the first printing operation 510*a*. The concentration of particles 530*a* may be used to determine if an overall concentration of particles within the printing environment is to exceed the threshold value 501. In case of having additional printing systems, the first printing system may discover them as previously described in the description. Upon discovering the additional printing systems and determining its additional concentration of particles, remedial actions may be scheduled to be executed to the main printing system or the additional printing systems in case the threshold concentration is to be exceeded by the concentration of particles resulting from the aggregation of the printing systems within the printing environment.

As shown in FIG. 5A, the concentration of particles 530*a* resulting from the aggregation of both printing operations is to exceed the threshold concentration 501 at a time 502. In order to reduce the concentration to acceptable levels, remedial actions may be applied to at least one of the first printing operation 510*a* and the second printing operation 520*a*. Examples of remedial actions comprise scheduling the start of the printing operations, modifying the printing speed of the fluid dispenser, and modifying the density of the fluid deposition, amongst others.

In some examples, the printing operations may be scheduled to start at a different time than the expected so as to comply with the threshold levels of concentration of particles. In some cases, the printing operations for the printing systems may be scheduled to be performed automatically, without the assistance of operators. Therefore, in case of knowing beforehand that a set of printing operations have to be available before a deadline, a scheduling of the printing operations may be performed. In an example, printing operations may be assigned with a priority, wherein printing operations with a higher priority are less likely to be affected by a remedial action, as previously described above in reference to other examples. In other examples, the scheduling of the printing operations and the remedial actions may be based on a criterion, wherein the criterion may comprise a set of characteristics of the printing operation.

In other examples, the remedial actions may be scheduled so as to reduce an additional time of each of the printing operation and the additional printing operations. The additional time may be determined as a difference between an expected time of an operation and an actual time of the operation, as previously explained in reference to FIG. 4 with the additional time 416.

Figure 5B:
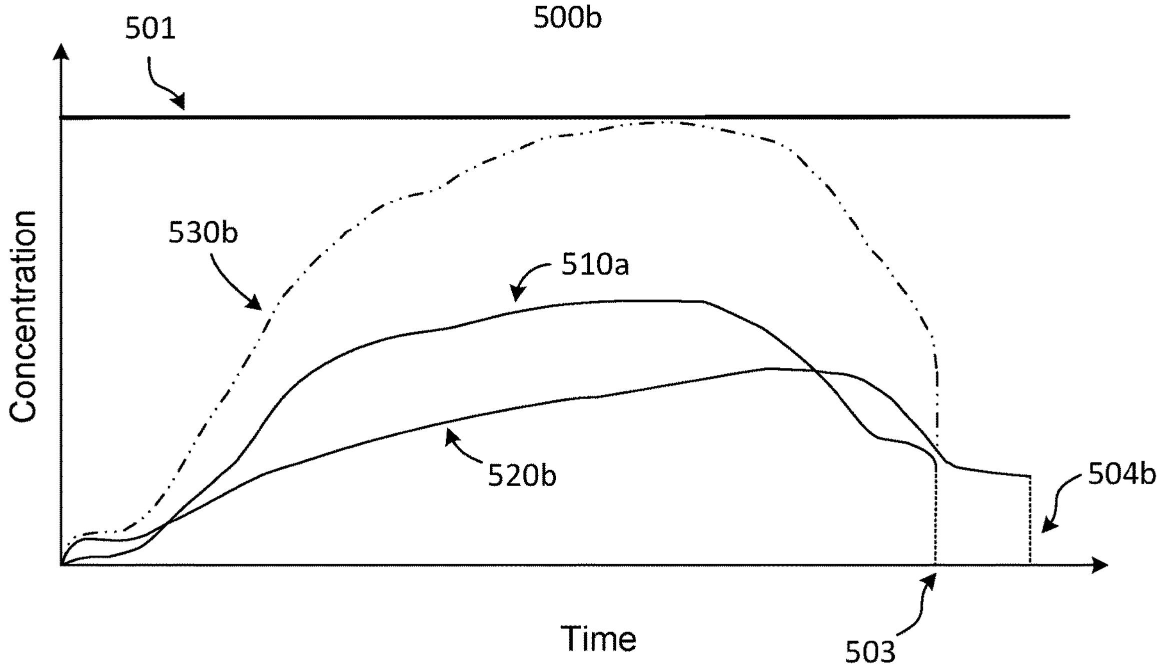
FIG. 5B shows the line chart of FIG. 5A upon applying a remedial action.

Referring now to FIG. 5B, a line chart 500*b* representing concentrations generated by the first printing system and the second printing system of FIG. 5A is shown. The line chart 500*b* represents the concentrations of particles generated by the printing systems of FIG. 5A upon remedial actions have been executed on a second printing operation 520*b*. In other examples, remedial actions may also be executed on the first printing operation 510*a*. In FIG. 5B, the remedial action comprises scheduling the second printing operation 520*b* of the second printing system to start at a different time and modifying a printing speed of the fluid dispenser so as to reduce the generation of particles during the second printing operation 520*b*. As a result, a concentration of particles 530*b* within the printing environment will not exceed the threshold 501. Further, a finish time 504*b* of the second printing operation 520*b* is increased as a result of the remedial action.

In other examples, remedial actions may be executed so as to reduce an additional printing time for the printing operations. Even though the finish time 504*b* of the second printing operation 520*b* is greater than the finish time 504*a*, in other examples the printing times for the printing operations may be reduced as a result of the execution of remedial actions. In some other examples, other remedial actions may be possible depending on the criteria selected by the operator of the printing systems or pre-defined criteria such as reducing overall delays.

According to some examples, a printing device is managed by a printing control system. The printing device may have a series of printing operations to execute, wherein the printing device is within a printing environment characterized by configuration data. In an example, the configuration data of the printing environment comprises dimensions of a volume in which the printing device is to be located and the air change rate for the volume.

In other examples, the configuration data may further comprise a relative location of the printing device within the volume. In case of having additional printing device(s) managed by the printing control system in the same printing environment, the additional printing device(s) may share the configuration data with the printing device.

Figure 6:
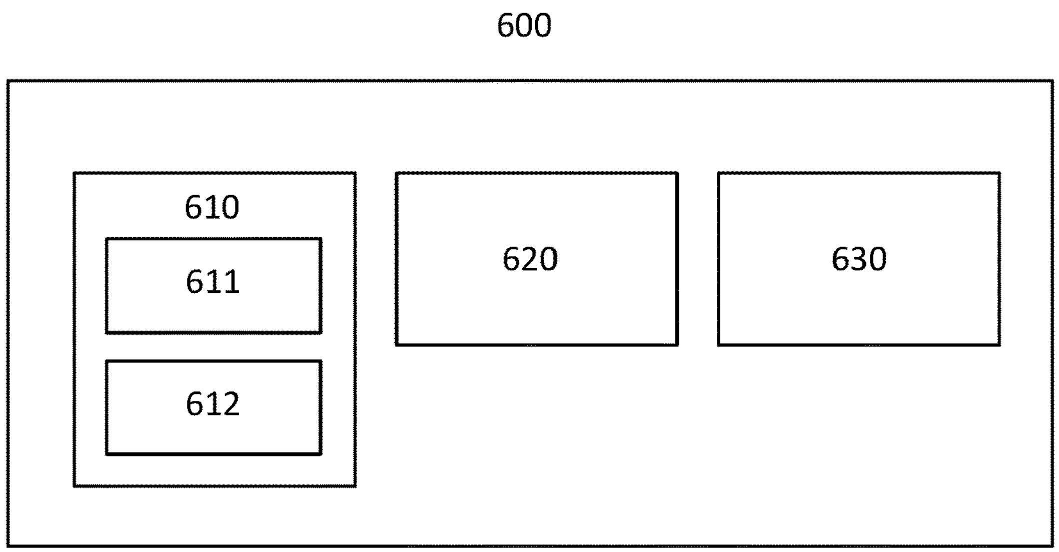
FIG. 6 shows a printing control system, according to an example of the present disclosure.

Referring now to FIG. 6, a printing control system 600 is shown. The printing control system 600 comprises a memory 610, a printing device 620 to execute a printing operation, and a processor 630. The memory 610 comprises configuration data 611 of a printing environment and a threshold concentration 612, wherein the configuration data 611 and the threshold concentration 612 can be inserted during the installation of the system or updated based on changes performed on the layout and/or the equipment of the printing environment. The processor 630 may access the memory 610 to obtain the configuration data 611 and the threshold concentration 612. Based on the obtained data, the processor 630 is to determine, based on the configuration data 611, if a concentration of particles emitted in the printing operation is to exceed the threshold concentration 612 over a time period, and the processor 630 is to execute a remedial action on the printing operation if the concentration of particles exceeds the threshold over the time period. The remedial action executed on the printing operation comprises the remedial actions previously explained in other examples.

In an example, the configuration data 611 of the printing environment for the printing control system 600 comprises dimensions of a volume in which the printing device is to be located and an air change rate for the volume. The air change rate may be defined as a measure of the air volume added to or removed for a space divided by the volume of the space.

In some examples, the memory 610 may be replaced for a processor-readable media including, for example, electronic, magnetic, optical, electromagnetic, or semiconductor media. More specific examples of suitable processor-readable media include a hard drive, a random access memory (RAM), a read-only memory (ROM), memory cards and sticks and other portable storage devices.

According to some examples, the processor 630 of the printing control system 600 is further to discover additional printing devices to execute additional printing operations in the printing environment, to determine an additional concentration of particles of the additional printing operations, and to aggregate the additional concentration of particles of the additional printing operations to the concentration of particles of the printing operation. In case the concentration of particles exceeds the threshold concentration 612 within the time period execute the remedial action further comprises executing the remedial action on the additional printing operations. In some examples, the processor is further to receive a criterion to apply the remedial action and schedule a time in which the remedial action will be executed on at least one of the printing operation and the additional printing operations.

In some examples, the additional printing devices may be discovered by using a local network. In an example, the additional printing systems are discovered by using a wired connection or a wireless connection, for instance by using Wi-Fi, Bluetooth, or a networking cable such as an ethernet cable. However, any other suitable discovery protocol may be used.

According to some examples, a computer-readable storage medium comprises instructions that, when executed by a processor, cause a printing system to: read configuration data of a printing environment, determine based on the configuration data if a concentration of particles emitted by the printing system during a printing operation is to exceed a threshold concentration, and, schedule remedial actions to be executed on the printing operation if the concentration of particles is to exceed the threshold of particles.

In some examples, the computer-readable storage medium may further comprise instructions that cause the printing system to discover additional printing systems in the printing environment, determine additional concentrations of particles emitted by the additional printing systems during the additional printing operations based on the configuration data, and aggregate the additional concentrations to the concentration of particles of the printing environment. If the concentration of particles of the printing environment is to exceed the threshold concentration, schedule remedial actions to be executed on the printing operation further comprises schedule remedial actions to be executed on the additional printing operations.

In other examples, when having more than one printing system within the printing environment, the computer-readable storage medium further comprises instructions that cause the printing system to assign a priority to the printing operation and the additional printing operations, wherein printing operations with a higher priority are less likely to be affected by a remedial action. In an example, the remedial actions are scheduled so as to reduce an additional time of each of the printing operation and the additional printing operations. As previously described in the description, the additional time is determined as a difference between an expected time of an operation and an actual time of the operation.

Figure 7:
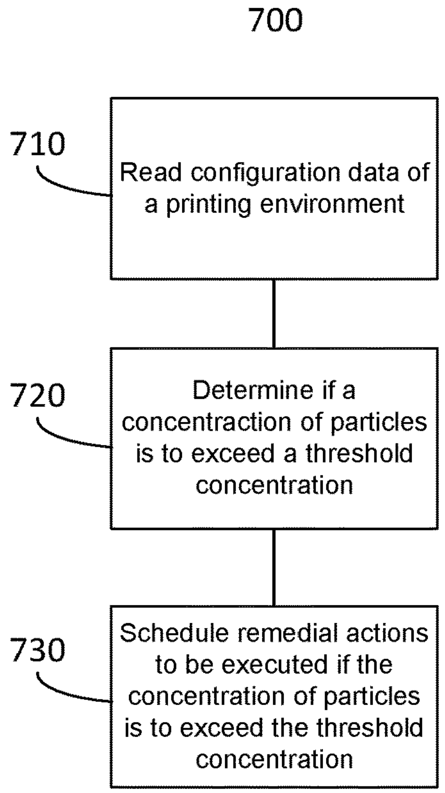
FIG. 7 shows a set of instructions to be executed by a processor, according to an example of the present disclosure.

Referring now to FIG. 7, a set of instructions 700 to be executed by a processor is shown. The set of instructions 700, when executed by a processor, cause a printing system to: read configuration data of a printing environment 710, determine if a concentration of particles is to exceed a threshold concentration 720, and schedule remedial actions to be executed if the concentration is to exceed the threshold concentration 730.

In an example, the remedial actions comprise at least one of modifying a printing speed of a dispenser of a printing operation and modifying an amount of fluid ejected by the dispenser during a printing operation. In other examples, in case of having more than one printing system within the printing environment, the set of instructions 700 may further comprise instructions to discover additional printing systems to perform additional printing operations. In that case, the remedial actions may comprise at least one of modifying a printing speed of at least one of the printing operation and the additional printing operations and modifying an amount of fluid ejected by the dispenser(s) during at least one of the printing operation and the additional printing operations.

In other examples, the set of instructions 700, when executed by a processor, cause a printing control system to perform the method 100 and the method 200 previously explained in reference to FIGS. 1 and 2. In an example, the printing control system may correspond to the printing control system 600 of FIG. 6, wherein a printing device or system is managed by the printing control system 600. In case of having additional printing devices or systems to execute additional printing operations, the printing control system 600 may schedule remedial actions if a threshold concentration is to be exceeded.

Figure 8:
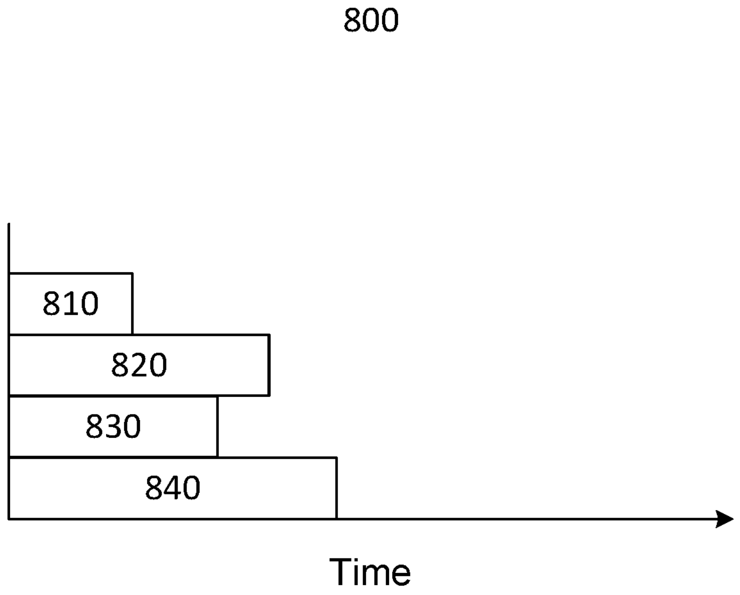
FIG. 8 shows a bar chart representing a set of print jobs over a time period, according to an example of the present disclosure; and, FIG. 9 shows the bar chart of FIG. 8 upon remedial actions are applied, according to an example of the present disclosure.

Referring now to FIG. 8, a bar chart 800 representing a set of printing operations is shown. The set of printing operations comprises a first printing operation 810, a second printing operation 820, a third printing operation 830, and a fourth printing operation 840 over a time period. The printing times for the printing operations are represented by the X-axis, wherein the first printing operation 810 is the shortest and the fourth printing operation 840 is the longest.

Upon determining a concentration of particles for the set of printing operations, as described above in the description, a series of remedial actions may be scheduled to be executed so as to prevent concentrations outside allowable levels. Taking into account the contribution to the total concentration of particles, each of the printing operations may be impacted by a remedial action. In an example, a priority value may be assigned for each of the printing operations and the printing operations with a higher priority are less likely to be affected by the remedial actions. In other examples, remedial actions may be scheduled so as to reduce an overall additional time to carry out the printing operations.

Figure 9:
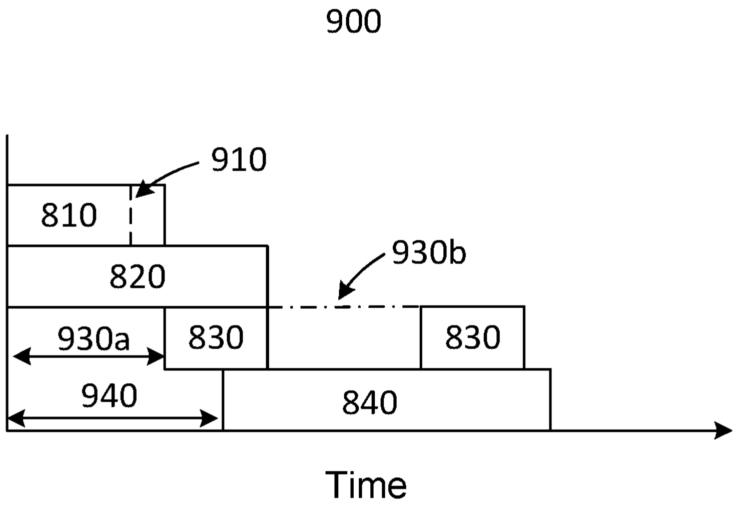

Referring now to FIG. 9, a bar chart 900 representing the printing operations of FIG. 8 is shown. The bar chart 900 comprises the set of printing operations of FIG. 8 upon remedial actions have been executed on the set of printing operations. The set of printing operations comprises the first printing operation 810, the second printing operation 820, the third printing operation 830, and the fourth printing operation 840. The series of remedial actions executed on the set of printing operations comprise a first remedial action 910 for the first printing operation 810, a second printing operation **930*a* and a third printing operation 930*b* for the third printing operation 830, and a fourth remedial action 940 for the fourth printing operation 840. The remedial actions enable to maintain the concentration of particles within the printing environment below the threshold concentration value, as previously explained in reference to FIGS. 3, 4, 5A and 5**B.

The first remedial action 910 comprises modifying the printing speed of the first printing operation 910 so that the first printing operation 810 can be performed at the same time as the second printing operation 920. The second remedial action **930*a* comprises delaying a start of the third printing operation 830 so as to keep the concentration of particles of the printing environment below the threshold. Upon the first printing operation 910 is finished, the third printing operation 830 starts. Additionally, the third remedial action 930*b* is executed on the third printing operation 830, wherein the third remedial action 930*b* comprises stopping the third printing operation 830 because the nature of the printing operation and its characteristics enable to do it. In other examples, in case of assigning as criterion the reduction of the additional time for the printing operations. The fourth remedial action 940 comprises delaying the start of the fourth printing operation 840 so that the printing operation is scheduled to be executed at the same time as the second printing operation 820 and the third printing operation 830. Since the third remedial action 930*b* takes place meanwhile the fourth printing operation 840 is being performed, it enables to perform the fourth printing operation 840** in a continuous manner, i.e., without interruptions. Furthermore, an additional time for the set of printing operations is reduced.

According to some examples, a printing system may perform a series of printing operations. In the same way, as previously explained in reference to a printing operations, remedial actions may be executed on the series of printing operations based on the determination of concentration of particles. In case that the printing environment comprises additional printing systems to perform additional printing operations, remedial actions may be executed on them. When scheduling remedial actions on the printing systems while having a series of printing operations in each of the printing systems, a printing operation order in each of the printing system(s) may be defined, taking into account the concentration of particles within the environment based on the configuration data. In some examples, when applying priorities and/or a criterion for the selection, different alternatives for the series of printing operations are possible. An alternative may be selected automatically or manually by a user. In some other examples, an optimal solution for the remedial actions may be selected so as to fulfill a rule, for instance reducing an overall additional printing time.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method for a printing system, the method comprising:

reading configuration data of a printing environment for the printing system;

determining based on the configuration data if a concentration of particles emitted during a printing operation of the printing system will exceed a threshold over a time period; and, executing at least one remedial action on the printing operation if the concentration of particles will exceed the threshold over the time period.

2. The method as claimed in claim 1, wherein the method further comprises:

discovering additional printing systems in the printing environment;

determining an additional concentration of particles emitted during additional printing operations of the additional printing systems based on the configuration data; and, aggregating the additional concentration to the concentration of particles.

3. The method as claimed in claim 1, wherein the configuration data of the printing environment comprises:

dimensions of a volume in which the printing system is to be located; and, an air change rate for the volume.

4. The method as claimed in claim 3, wherein the remedial action comprises at least one action selected from:

modifying a printing speed of a dispenser of the printing system; and, modifying an amount of fluid ejected by the dispenser of the printing system.

5. The method as claimed in claim 1, wherein the concentration of particles comprises a concentration of volatile organic compounds.

6. A printing control system comprising:

a memory comprising:

configuration data of a printing environment; and, a threshold concentration;

a printing device to execute a printing operation; and a processor to:

determine based on the configuration data if a concentration of particles emitted in the printing operation is to exceed the threshold concentration over a time period; and, execute a remedial action on the printing operation if the concentration of particles exceeds the threshold over the time period.

7. A system as claimed in claim 6, wherein the configuration data of the printing environment comprises:

dimensions of a volume in which the printing device is to be located; and, an air change rate for the volume.

8. A system as claimed in claim 7, wherein the remedial action comprises at least one action selected from:

modifying a dispenser speed of a dispenser of the printing device; and, modifying an amount of fluid ejected by the dispenser of the printing device, wherein the remedial action is selected based on a set of characteristics of the printing operation.

9. A system as claimed in claim 7, the processor further to:

discover additional printing devices to execute additional printing operations in the printing environment;

determine additional concentrations of particles of the additional printing operations; and, aggregate the additional concentrations of particles of the additional printing operations to the concentration of particles of the printing operation, wherein if the concentration of particles exceeds the threshold within the time period, execute the remedial action further comprises execute the remedial action on the additional printing operations.

10. A system as claimed in claim 9, the processor further to:

receive a criterion to apply the remedial action; and, schedule a time in which the remedial action will be executed on at least one of the printing operation and the additional printing operations, wherein the time is selected based on the criterion.

11. A computer-readable storage medium comprising instructions that, when executed by a processor, cause a printing system to:

read configuration data of a printing environment;

determine based on the configuration data if a concentration of particles emitted by the printing system during a printing operation is to exceed a threshold concentration; and, schedule remedial actions to be executed on the printing operation if the concentration of particles is to exceed the threshold concentration.

12. The computer-readable storage medium as claimed in claim 11, further comprising instructions that cause the printing system to:

discover additional printing systems in the printing environment;

determine additional concentrations of particles emitted by the additional printing systems during additional printing operations based on the configuration data; and, aggregate the additional concentrations to the concentration of particles of the printing environment, wherein if the concentration of particles of the printing environment is to exceed the threshold concentration, schedule remedial actions to be executed on the printing operation further comprises schedule remedial actions to be executed on the additional printing operations.

13. The computer-readable storage medium as claimed in claim 12, further comprising instructions that cause the printing system to:

assign a priority to the printing operation and the additional printing operations, wherein printing operations with a higher priority are less likely to be affected by a remedial action.

14. The computer-readable storage medium as claimed in claim 13, wherein the remedial actions are scheduled so as to reduce an additional time of each of the printing operation and the additional printing operations, wherein the additional time is determined as a difference between an expected time of an operation and an actual time of the operation.

15. The computer-readable storage medium as claimed in claim 13, wherein the remedial actions comprise at least one of:

modifying a printing speed of at least one of the printing operation and the additional printing operations; and, modifying an amount of fluid ejected during at least one of the printing operation and the additional printing operations.

* * * * *